(12) United States Patent
Kiyono

(10) Patent No.: US 11,773,790 B2
(45) Date of Patent: Oct. 3, 2023

(54) THROTTLE DEVICE

(71) Applicant: MIKUNI CORPORATION, Tokyo (JP)

(72) Inventor: Jun Kiyono, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 66 days.

(21) Appl. No.: 17/202,888

(22) Filed: Mar. 16, 2021

(65) Prior Publication Data

US 2021/0340918 A1   Nov. 4, 2021

(30) Foreign Application Priority Data

May 1, 2020 (JP) .................................. 2020-081076
Feb. 2, 2021 (JP) .................................. 2021-015162

(51) Int. Cl.
*F02D 9/10* (2006.01)
*F02D 9/02* (2006.01)

(52) U.S. Cl.
CPC ........ *F02D 9/10* (2013.01); *F02D 2009/0201* (2013.01); *F02D 2009/0205* (2013.01)

(58) Field of Classification Search
CPC ..... F02D 2009/0201; F02D 2009/0279; F02D 9/10; F02D 2009/0205; F02D 9/109;
(Continued)

(56) References Cited

U.S. PATENT DOCUMENTS 4,254,747 A * 3/1981 Sumiyoshi ............... F02B 31/08
123/184.59
4,539,963 A * 9/1985 Brisbane ............... F02D 11/106
73/114.36

(Continued)

FOREIGN PATENT DOCUMENTS

| DE | 102014225626 A1 | 6/2016 |
| DE | 102017222694 A1 | 6/2019 |
| DE | 102018213237 A1 | 2/2020 |
| JP | 60192813 A * | 10/1985 |
| JP | 08193528 A * | 7/1996 |

(Continued)

OTHER PUBLICATIONS

Extended European Search Report issued in European Appln. No. 21167574.9 dated Sep. 17, 2021.

*Primary Examiner* — Logan M Kraft
*Assistant Examiner* — Joshua Campbell
(74) *Attorney, Agent, or Firm* — ROSSI, KIMMS & McDOWELL LLP

(57) ABSTRACT

A throttle device 1 includes a throttle valve 2 which is disposed in an intake passage 101, and includes a first valve body 20 and a first rotatable shaft 21 for rotatably holding the first valve body 20, a bypass valve 3 which is disposed in a bypass passage 8 connected to the intake passage 101 so as to bypass the throttle valve 2, and includes a second valve body 30 and a second rotatable shaft 31 for rotatably holding the second valve body 30, a common motor 4 for applying a driving force to the throttle valve 2 and the bypass valve 3, a first gear 5 configured to be able to transmit or block the driving force of the motor 4 with respect to the first rotatable shaft 21, a second gear 6 configured to receive the driving force of the motor 4 and transmit the driving force to the second rotatable shaft 31, and a sensor 7 for detecting a rotation amount of the second rotatable shaft 31 of the bypass valve 3 or another rotatable shaft rotating in conjunction with the second rotatable shaft 31.

14 Claims, 14 Drawing Sheets

(58) Field of Classification Search
CPC ........... F02D 9/1055; F02D 2009/0252; F02D 31/005; F02B 31/085; F02B 2031/003
USPC ............................. 123/336, 339.23; 137/595
See application file for complete search history.

(56) References Cited

U.S. PATENT DOCUMENTS

| | | | | | |
|---|---|---|---|---|---|
| 4,702,214 | A | * | 10/1987 | Wataya | F02D 41/187 |
| | | | | | 123/488 |
| 4,714,063 | A | * | 12/1987 | Oda | F02B 31/08 |
| | | | | | 123/308 |
| 4,995,347 | A | * | 2/1991 | Tate | F02B 33/446 |
| | | | | | 123/65 BA |
| 7,735,467 | B2 | | 6/2010 | Wong | |
| 2002/0188941 | A1 | * | 12/2002 | Cicciarelli | G06F 8/60 |
| | | | | | 717/174 |
| 2003/0116127 | A1 | * | 6/2003 | Asano | F02D 19/023 |
| | | | | | 123/339.23 |
| 2005/0188941 | A1 | * | 9/2005 | Ward | F02M 35/10032 |
| | | | | | 123/184.56 |
| 2008/0230034 | A1 | * | 9/2008 | Dunn | F02D 9/109 |
| | | | | | 123/336 |
| 2009/0293973 | A1 | * | 12/2009 | Albert | F16K 1/221 |
| | | | | | 251/129.01 |
| 2014/0352657 | A1 | * | 12/2014 | Waits | F02D 9/103 |
| | | | | | 123/337 |

FOREIGN PATENT DOCUMENTS

| | | | | |
|---|---|---|---|---|
| JP | 2001248449 | A | * | 9/2001 |
| JP | 2015101995 | A | | 6/2015 |

* cited by examiner

THROTTLE DEVICE

TECHNICAL FIELD

The present disclosure relates to a throttle device.

BACKGROUND

For example, Patent Document 1 describes a throttle device having a bypass system in which intake air is bypassed to a bypass passage via a bypass valve (idle speed control valve) from upstream to downstream of a throttle valve.

CITATION LIST

Patent Literature

Patent Document 1: JP2015-101995A

SUMMARY

Meanwhile, in the throttle device having such a bypass system, separately providing an actuator for driving the bypass valve in addition to an actuator for driving the throttle valve, a cost and weight of the throttle device are increased. In this regard, Patent Document 1 does not disclose any finding for suppressing the increase in cost and weight of the throttle device.

Moreover, in the throttle device described in Patent Document 1, the opening degree of the throttle valve is adjusted based on a detection result of a throttle position sensor, whereas the opening degree of the bypass valve is adjusted based on respective detection results of an intake-air temperature sensor for detecting a temperature of the intake air flowing through the bypass passage and an intake-air pressure sensor for detecting a pressure of the intake air flowing through the bypass passage. Thus, it may be impossible to accurately adjust the opening degree of the bypass valve.

The present disclosure was made in view of the above problem, and an object of the present disclosure is to provide a throttle device capable of suppressing the cost and the weight, and accurately adjusting the opening degree of the bypass valve.

(1) A throttle device according to at least one embodiment of the present disclosure includes a throttle valve which is disposed in an intake passage, and includes a first valve body and a first rotatable shaft for rotatably holding the first valve body, a bypass valve which is disposed in a bypass passage connected to the intake passage so as to bypass the throttle valve, and includes a second valve body and a second rotatable shaft for rotatably holding the second valve body, a common motor for applying a driving force to the throttle valve and the bypass valve, a first gear configured to be able to transmit or block the driving force of the motor with respect to the first rotatable shaft, a second gear configured to receive the driving force of the motor and transmit the driving force to the second rotatable shaft, and a sensor for detecting a rotation amount of the second rotatable shaft of the bypass valve or another rotatable shaft rotating in conjunction with the second rotatable shaft.

(2) In some embodiments, in the above configuration (1), the throttle device may further include an intermediate plate fixed to the first rotatable shaft of the throttle valve, the intermediate plate including an engagement protrusion at an outer circumferential edge thereof, the first gear may be disposed on a close side in a valve opening direction of the throttle valve relative to the engagement protrusion of the intermediate plate, and may include a close-side engagement portion engageable with the engagement protrusion, and the first gear may be configured such that in a fully-closed state of the throttle valve, the close-side engagement portion is spaced apart from the engagement protrusion of the intermediate plate, and the driving force from the first gear to the first rotatable shaft is blocked, and in an opened state of the throttle valve, the close-side engagement portion is brought into contact with the engagement protrusion of the intermediate plate, and the driving force from the first gear to the first rotatable shaft is transmitted.

(3) In some embodiments, in the above configuration (2), the bypass valve may be configured such that an opening degree thereof is adjusted by the driving force received by the second gear via the first gear, in a state in which the close-side engagement portion is spaced apart from the engagement protrusion of the intermediate plate.

(4) In some embodiments, in the above configuration (2) or (3), the intermediate plate may include a first locking protrusion for restricting movement of the intermediate plate to the close side in the valve opening direction, and the throttle device may further include a first stopper configured to be engageable with the first locking protrusion, in order to prevent the intermediate plate from rotating to the close side in the valve opening direction beyond a limit position corresponding to a fully-closed position of the throttle valve.

(5) In some embodiments, in the above configuration (4), the throttle device may further include a first biasing member for biasing the intermediate plate to the close side in the valve opening direction to bring the first locking protrusion closer to the first stopper.

(6) In some embodiments, in any one of the above configurations (2) to (5), the throttle device may further include a second biasing member for biasing the first gear to an open side in the valve opening direction to bring the close-side engagement portion of the first gear closer to the engagement protrusion of the intermediate plate.

(7) In some embodiments, in the above configuration (5), the throttle device may further include a second biasing member for biasing the first gear to an open side in the valve opening direction to bring the close-side engagement portion of the first gear closer to the engagement protrusion of the intermediate plate. The second biasing member may have a biasing force smaller than that of the first biasing member.

(8) In some embodiments, in any one of the above configurations (2) to (7), the intermediate plate may include a second locking protrusion for restricting movement of the intermediate plate to an open side in the valve opening direction, and the throttle device may further include a second stopper configured to be engageable with the second locking protrusion, in order to prevent the intermediate plate from rotating to the open side in the valve opening direction beyond a limit position corresponding to a fully-opened position of the throttle valve.

(9) In some embodiments, in any one of the above configurations (1) to (8), the throttle device may further include a controller configured to control the motor based on a detection result of the sensor.

(10) In some embodiments, in any one of the above configurations (1) to (9), the bypass valve may include a rotary valve disposed in the bypass passage rotatably about the second rotatable shaft.

(11) In some embodiments, in the above configuration (10), the bypass passage may include an inlet passage, and an outlet passage extending in a direction crossing the inlet passage at an acute angle in a planar view as viewed from an axis direction of the second rotatable shaft, and the rotary valve may be disposed in a crossing part of the inlet passage and the outlet passage.

(12) In some embodiments, in any one of the above configurations (1) to (11), the sensor may be mounted on the second rotatable shaft of the bypass valve to detect a rotation amount of the second rotatable shaft of the bypass valve.

(13) In some embodiments, in any one of the above configurations (1) to (12), the bypass valve may be disposed opposite to the motor across the throttle valve, and the second gear may be is configured to receive the driving force of the motor via the first gear.

(14) In some embodiments, in any one of the above configurations (1) to (12), the bypass valve may be disposed opposite to the throttle valve across the motor, and the second gear may be is configured to receive the driving force of the motor via a power transmission path without the first gear.

According to at least one embodiment of the present disclosure, provided is a throttle device capable of suppressing a cost and a weight, and accurately adjusting the opening degree of a bypass valve.

DETAILED DESCRIPTION

Figure 1:
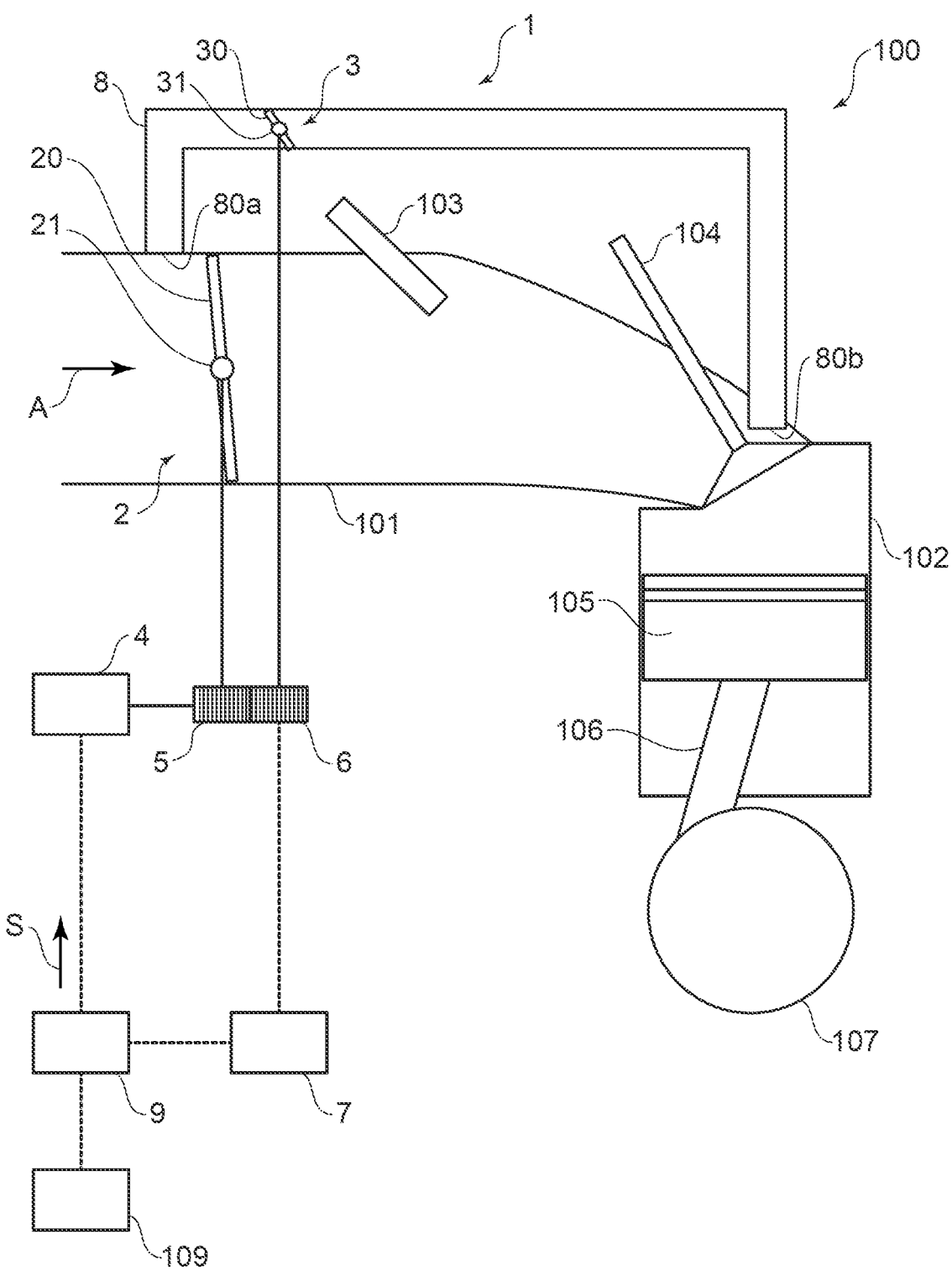
FIG. 1 is a schematic view showing the configuration of an engine according to an embodiment of the present disclosure.

An embodiment of the present disclosure will now be described with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

The configuration of a throttle device according to an embodiment of the present disclosure will be described. The throttle device is mounted on an intake side of a multi-cylinder engine mounted on a two-wheeled vehicle so as to adjust the amount of intake air flowing into the multi-cylinder engine, for example. In the present disclosure, a description will be given by taking a throttle device, which is mounted on an engine having two cylinders, as an example.

FIG. 1 is a schematic view showing the configuration of an engine 100 according to an embodiment of the present disclosure. As shown in FIG. 1, a throttle device 1 mounted on the engine 100 includes a throttle valve 2, a bypass valve 3, a motor 4, a first gear 5, a second gear 6, and a sensor 7.

The throttle valve 2 is disposed in an intake passage 101, and includes a first valve body 20 and a first rotatable shaft 21 for rotatably holding the first valve body 20. The intake passage 101 is a passage for supplying air (intake air A), which is taken from the outside of a vehicle such as a two-wheeled vehicle, to a cylinder 102 of the engine 100. The throttle device 1 constitutes a part of the intake passage 101. The first valve body 20 is fixed to the first rotatable shaft 21 and rotates about the first rotatable shaft 21 along with a rotation of the first rotatable shaft 21. With the rotation of the first valve body 20, an intake air amount of the intake air A flowing through the intake passage 101 is adjusted. In the exemplary form shown in FIG. 1, in a flow direction in which the intake air A flows through the intake passage 101, a fuel injection device 103 and an intake valve 104 are disposed downstream of the throttle valve 2 in the intake passage 101. The intake air A flowing through the intake passage 101 is mixed with fuel injected into the intake passage 101 by the fuel injection device 103 and is sent into the cylinder 102 by the intake valve 104. Then, combusting the air-fuel mixture in the cylinder 102, a piston 105 is reciprocated in the cylinder 102, and energy generated by the reciprocation is transmitted to a crank shaft 107 via a con rod 106.

The bypass valve 3 is disposed in a bypass passage 8 connected to the intake passage 101 so as to bypass the throttle valve 2, and includes a second valve body 30 and a second rotatable shaft 31 for rotatably holding the second valve body 30. In the exemplary form shown in FIG. 1, in the flow direction, an inlet 80a of the bypass passage 8 is formed upstream of the throttle valve 2 and an outlet 80b of the bypass passage 8 is formed downstream of the throttle valve 2 in the intake passage 101. The second valve body 30 is fixed to the second rotatable shaft 31 and rotates about the second rotatable shaft 31 along with a rotation of the second rotatable shaft 31. With the rotation of the second valve body 30, an intake air amount of the intake air A flowing through the bypass passage 8 is adjusted.

The opening degree of each of the above-described throttle valve 2 and bypass valve 3 can be adjusted by a driving force applied from the common motor 4.

The first gear 5 is configured to be able to receive the driving force of the motor 4. The first gear 5 is mounted on the first rotatable shaft 21 of the throttle valve 2 and is configured to be able to transmit or block the driving force of the motor 4 with respect to the first rotatable shaft 21.

The second gear 6 is configured to be able to receive the driving force of the motor 4 via the first gear 5. The second gear 6 is mounted on the second rotatable shaft 31 of the bypass valve 3 and is configured to transmit the driving force of the motor 4 to the second rotatable shaft 31.

Figure 8:
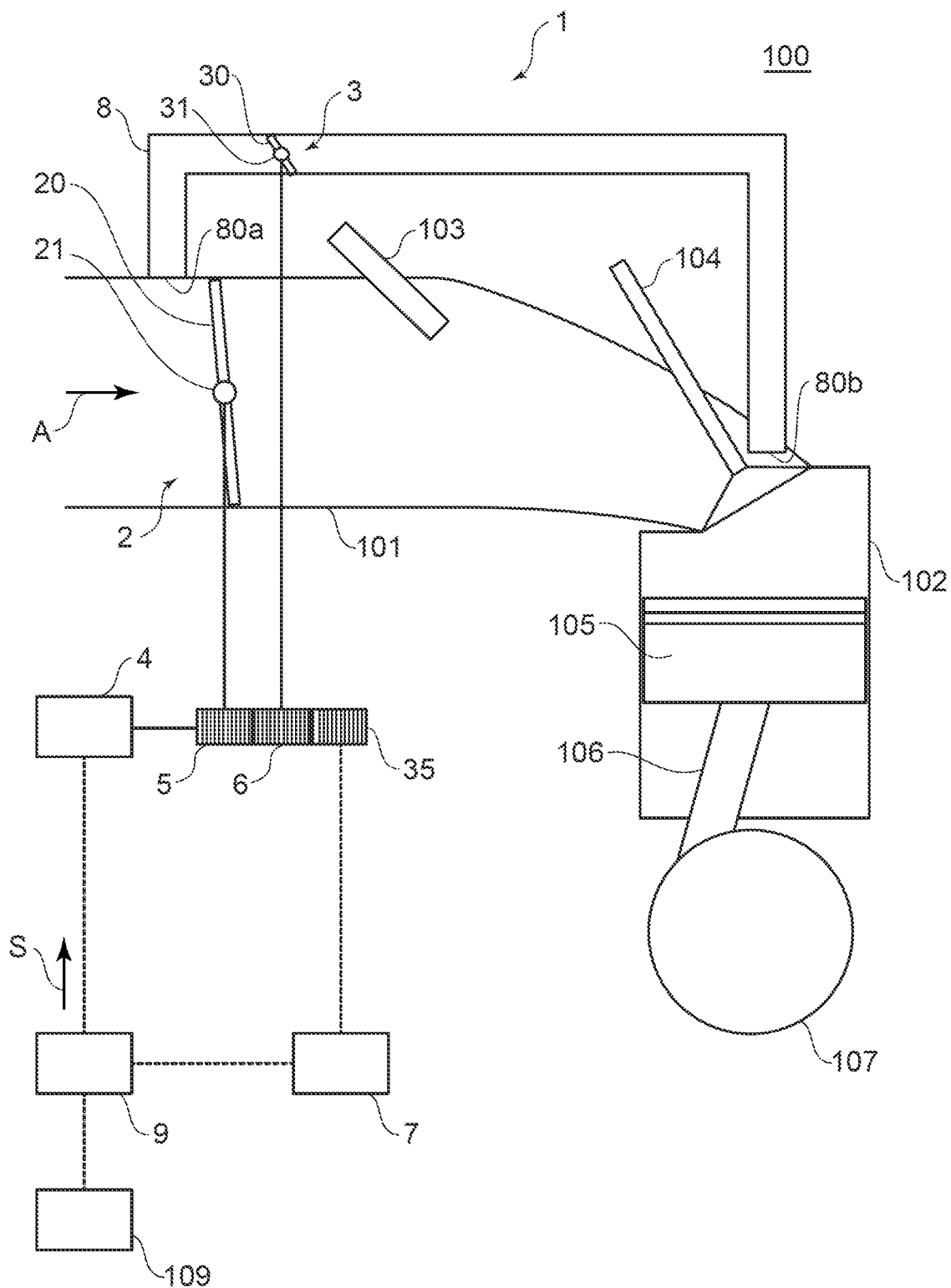
FIG. 8 is a schematic view showing the configuration of the engine according to another embodiment of the present disclosure.

The sensor 7 is configured to detect a rotation amount of the second rotatable shaft 31 of the bypass valve 3. The sensor 7 is, for example, a position sensor for detecting a rotation angle of the second rotatable shaft 31. Moreover, the sensor 7 can also detect a rotation amount of the first rotatable shaft 21 of the throttle valve 2 by detecting the rotation amount of the second rotatable shaft 31 of the bypass valve 3. This is because the second rotatable shaft 31 of the bypass valve 3 keeps rotating by the driving force received from the motor 4 via the first gear 5 and the second gear 6. In some embodiments, as shown in FIG. 8, the throttle device 1 may further include an interlocking gear 35 configured to be able to receive the driving force of the motor 4 via the second gear 6. In this case, the sensor 7 may be configured to detect a rotation amount of a rotatable shaft (another rotatable shaft rotating in conjunction with the second rotatable shaft 31) of the interlocking gear 35.

In the exemplary form shown in FIG. 1, the throttle device 1 further includes a controller 9 configured to control the motor 4. The controller 9 is a computer such as an electronic control unit, and includes a CPU, a memory such as ROM or RAM, an I/O interface and the like (all of which are not shown). The controller 9 is electrically connected to the sensor 7 and acquires the rotation amount of the second rotatable shaft 31 detected by the sensor 7.

The controller 9 is electrically connected to the motor 4 such as a stepping motor. The controller 9 transmits, to the motor 4, a drive signal S for rotary driving the motor 4. The drive signal S is decided based on the rotation amount of the second rotatable shaft 31 detected by the sensor 7. The motor 4 having received the drive signal S is rotary driven at a rotation speed according to the drive signal S. Then, the opening degree of the bypass valve 3 is adjusted by the driving force of the motor 4. With such configuration, it is possible to accurately adjust the opening degree of the bypass valve 3 based on the actual opening degree of the bypass valve 3. Moreover, since the sensor 7 can also detect the rotation amount of the first rotatable shaft 21 by detecting the rotation amount of the second rotatable shaft 31, it is also possible to accurately adjust the opening degree of the throttle valve 2 based on the actual opening degree of the throttle valve 2.

In the exemplary form shown in FIG. 1, the controller 9 is also electrically connected to an accelerator grip 109. The controller 9 acquires a rotation amount of the accelerator grip 109 (so-called accelerator opening degree) detected from the accelerator grip 109. The drive signal S may be decided based on the rotation amount of the second rotatable shaft 31 and the accelerator opening degree.

Figure 2:
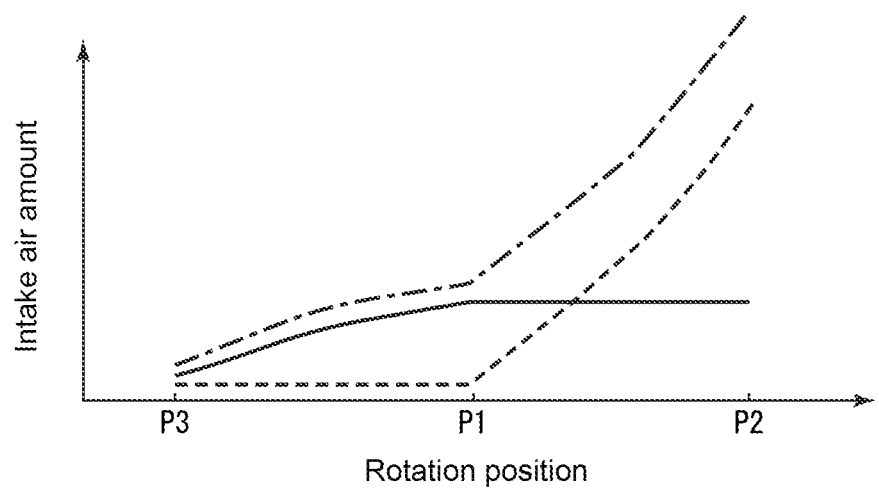
FIG. 2 is a graph showing the relationship between intake air amounts and rotation positions of a first gear.

The intake air amount of the intake air A adjusted in accordance with an operating condition of the engine 100 will be described here. FIG. 2 shows the relationship between angular positions of the first gear 5 and the intake air amounts of the intake air A. In FIG. 2, an intake air amount of the intake air A flowing through the bypass passage 8 is indicated by a solid line, an intake air amount of the intake air A flowing through the intake passage 101 is indicated by a dotted line, and a sum of the intake air amount of the intake air A flowing through the bypass passage 8 and the intake air amount of the intake air A flowing through the intake passage 101 is indicated by a single-dotted chain line.

An angular position of the first gear 5 when the throttle valve 2 is fully closed and the bypass valve 3 is fully opened (limit opening degree) is a first angular position P1, an angular position of the first gear 5 when both of the throttle valve 2 and the bypass valve 3 are fully opened is a second angular position P2, and a rotation position of the first gear 5 when both of the throttle valve 2 and the bypass valve 3 are fully closed is a third angular position P3.

The first angular position P1 is an original position where the first gear 5 should be recovered by an action of a first biasing member 24 and a second biasing member 26 to be described later, when the engine 100 is in a stopped state. With recovery of the first gear 5 to the first angular position P1 (original position), the throttle valve 2 is fully closed, and the bypass valve 3 is fully opened.

In a normal operation of the engine 100 (except in an idle operation of the engine 100), the throttle valve 2 is opened. In this case, the first gear 5 rotates within a range between the first angular position P1 and the second angular position P2, adjusting the intake air amount of the intake air A flowing through the intake passage 101. From the first angular position P1 toward the second angular position P2, the opening degree of the throttle valve 2 increases, and the intake air amount of the intake air A flowing through the intake passage 101 increases. Moreover, at this time, the bypass valve 3 is kept fully opened.

In the idle operation of the engine 100, the throttle valve 2 is closed. In this case, the first gear 5 rotates within a range between the first angular position P1 and the third angular position P3, adjusting the intake air amount of the intake air A flowing through the bypass passage 8. From the first angular position P1 toward the third angular position P3, the opening degree of the bypass valve 3 decreases, and the intake air amount of the intake air A flowing through the bypass passage 8 decreases. Moreover, at this time, the bypass valve 2 is kept fully closed. Thus, it is possible to improve engine combustibility and air amount resolution in the idle operation of the engine 100.

Figure 3:
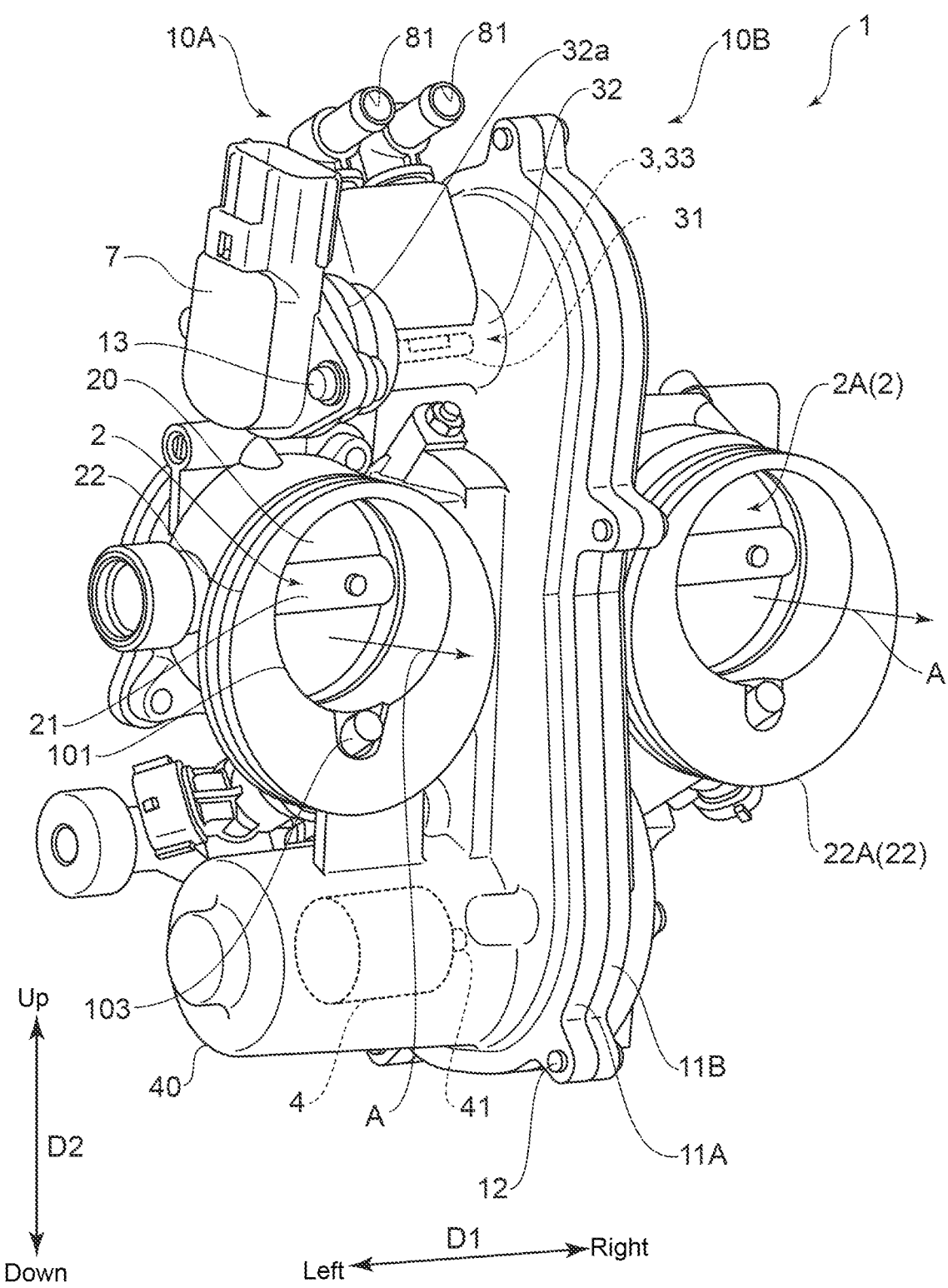
FIG. 3 is a perspective view showing the configuration of a throttle device according to an embodiment of the present disclosure.
Figure 4:
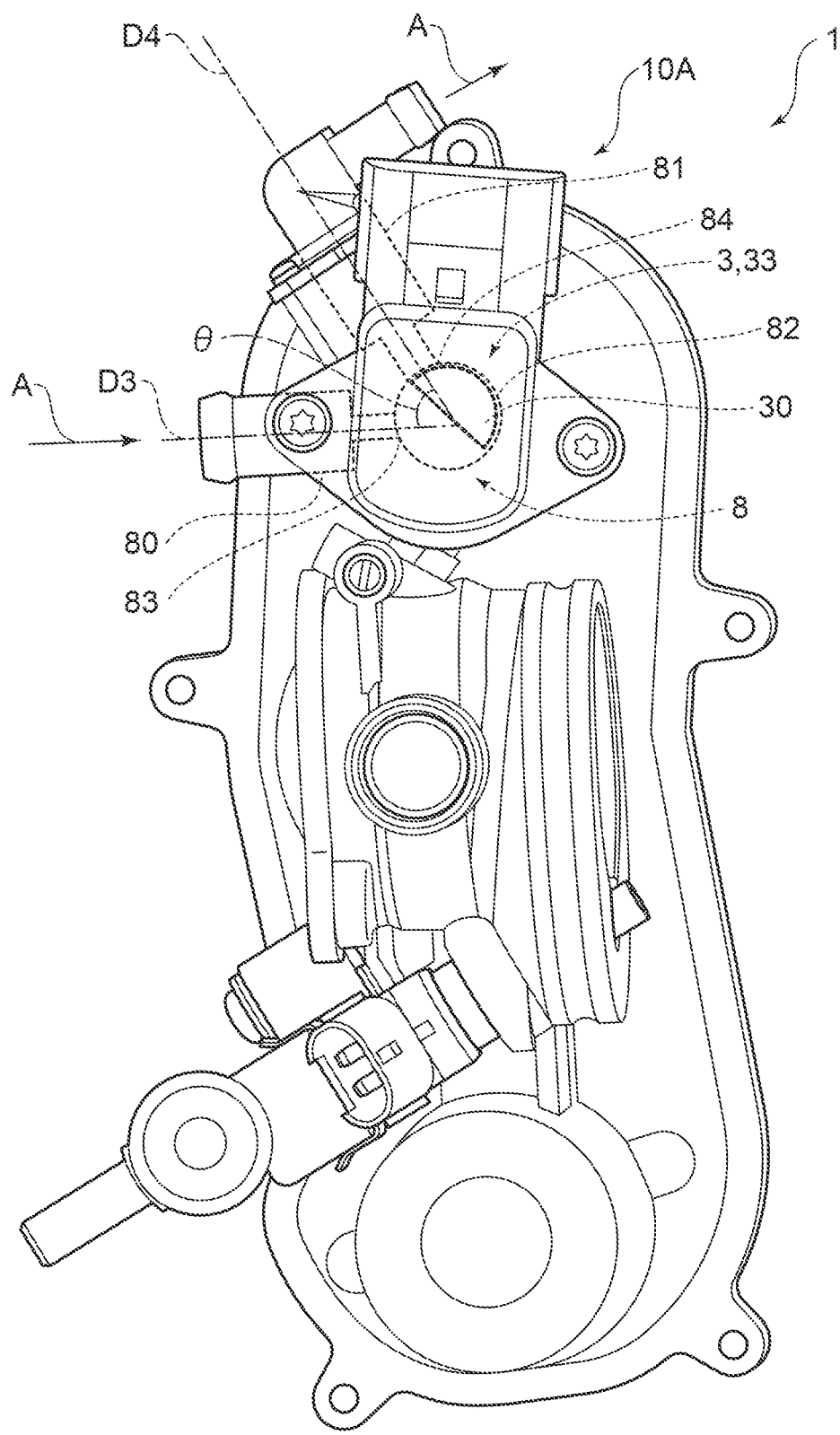
FIG. 4 is a side view showing the configuration of the throttle device according to an embodiment of the present disclosure and is a view as the throttle device of FIG. 3 is viewed from the left.

FIG. 3 is a perspective view showing an outer shape of the throttle device 1 according to an embodiment of the present disclosure. FIG. 4 is a side view as the throttle device 1 of FIG. 3 is viewed from the left. In an exemplary form shown in FIG. 3, the throttle device 1 includes a left-hand casing 10A and a right-hand casing 10B disposed in an axis direction (to be referred to as a "first direction D1", hereinafter) of the first rotatable shaft 21 of the throttle valve 2. The left-hand casing 10A is disposed on one side of the first direction D1 relative to the right-hand casing 10B. In the present disclosure, one side of the first direction D1 will be referred to as "left", and the other side of the first direction D1 will be referred to as "right".

The left-hand casing 10A includes a throttle body 22 for housing the throttle valve 2, a bypass valve housing body 32 for housing the bypass valve 3, and a motor casing 40 for housing the motor 4. The motor casing 40 is disposed opposite to the bypass valve housing body 32 across the throttle body 22 in a second direction D2. The second direction D2 is a direction, of a direction orthogonal to the first direction D1, in which with reference to the first rotatable shaft 21 of the throttle valve 2, one side where the motor casing 40 is disposed will be referred to as "down", and the other side which is an opposite direction to the one side will be referred to as "up". That is, in the present disclosure, if the first direction D1 is a "right-left direction", the second direction D2 is an "up-down direction" accordingly. In the second direction D2, the bypass valve housing body 32 is positioned above the throttle body 22, and the motor casing 40 is positioned below the throttle body 22. The right-hand casing 10B includes a second throttle body 22A (22) for housing a second throttle valve 2A (2). In another embodiment (not shown), in the second direction D2, the motor casing 40 may be disposed opposite to the fuel injection device 103 across the intake passage 101.

Moreover, in the exemplary form shown in FIG. 3, a right end portion 11A on the right side of the left-hand casing 10A and a left end portion 11B on the left side of the right-hand casing 10B are coupled to each other by a fastener 12 such as a bolt. Although not shown in FIG. 3, surrounded by the right end portion 11A of the left-hand casing 10A and the left end portion 11B of the right-hand casing 10B, a gear storage space 29 is formed. Moreover, the sensor 7 is mounted on a left end portion 32a of the bypass valve housing body 32 via a fastener 13 such as a bolt. In this case, the sensor 7 and the left end of the second rotatable shaft 31 of the bypass valve 3 are coupled to each other. With such configuration, the sensor 7 can suppress an error in detection result of the rotation amount of the second rotatable shaft 31.

In an exemplary form shown in FIG. 4, the bypass passage 8 includes an inlet passage 80, an outlet passage 81 and a crossing part 82. The inlet passage 80 is positioned upstream of the crossing part 82 in the flow direction of the intake air A. The outlet passage 81 is positioned downstream of the crossing part 82 in the flow direction of the intake air A. Moreover, in a planar view as viewed from the axis direction of the second rotatable shaft 31 (that is, in the drawing of FIG. 4), the outlet passage 81 extends in a direction crossing the inlet passage 80 at an acute angle θ. More specifically, provided that a direction orthogonal to an opening cross-section of an inlet 83 of the crossing part 82 is a first orthogonal direction D3 and a direction orthogonal to an opening cross-section of an outlet 84 of the crossing part 82 is a second orthogonal direction D4, the acute angle θ is an angle formed by crossing of the first orthogonal direction D3 and the second orthogonal direction D4. In the present disclosure, the bypass passage 8 includes two outlet passages 81 with respect to one inlet passage 80 see FIG. 3).

Moreover, in exemplary forms shown in FIGS. 3 and 4, respectively, the bypass valve 3 includes a rotary valve 33 disposed in the crossing part 82 of the bypass passage 8 rotatably about the second rotatable shaft 31. The rotary valve 33 includes the second valve body 30 having a semicircular shape (D-shape) as a cross-section orthogonal to the axis direction of the second rotatable shaft 31 is viewed. With such configuration, the second valve body 30 of the rotary valve 33 rotates in the crossing part 82 of the bypass passage 8, making it possible to adjust a flow passage area of a flow passage cross-section of the bypass passage 8 and to accurately adjust the opening degree of the rotary valve 33.

Figure 5:
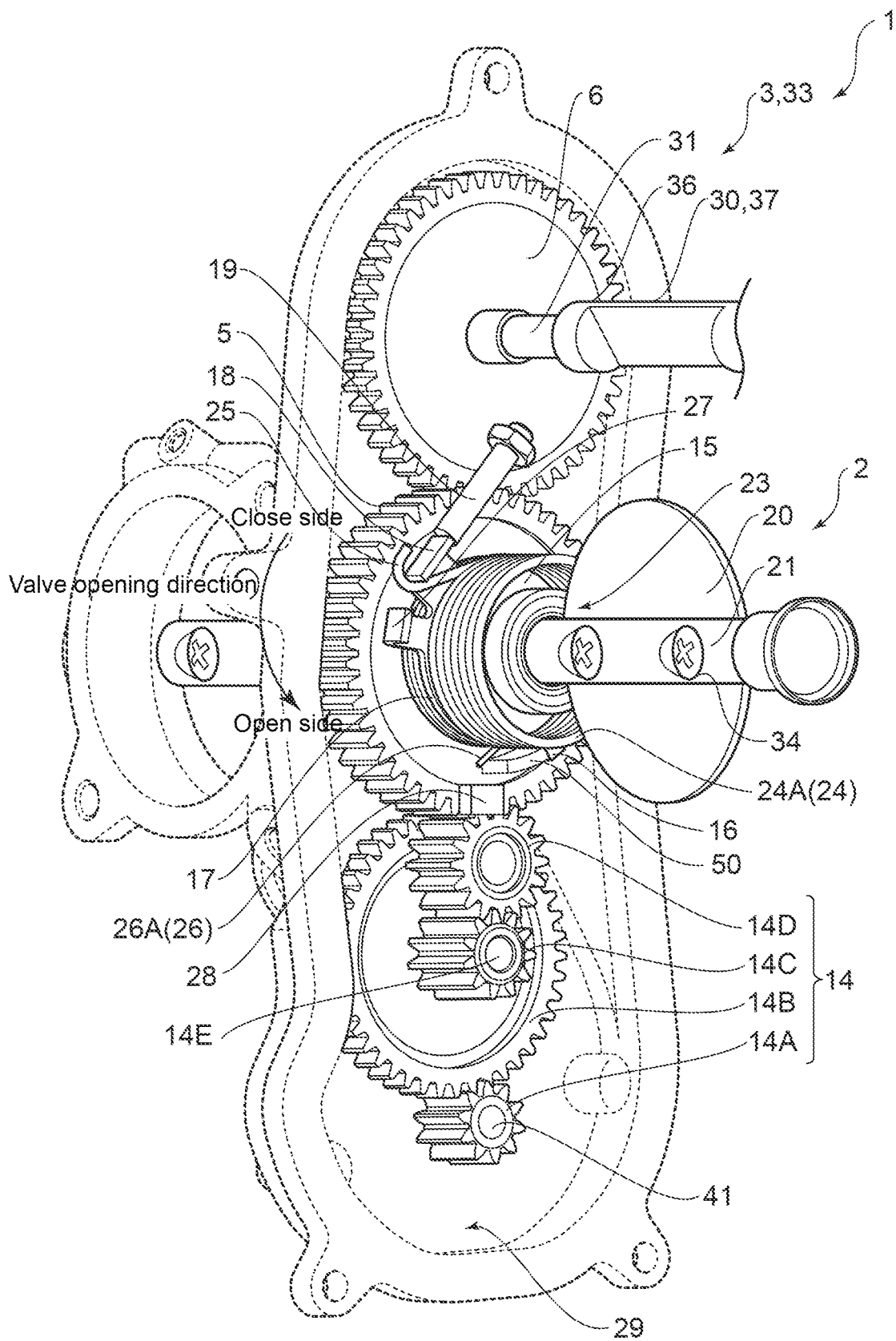
FIG. 5 is a perspective view showing the internal configuration of the throttle device according to an embodiment of the present disclosure.

Next, the internal configuration of the throttle device 1 according to an embodiment of the present disclosure will be described with reference to FIG. 5. FIG. 5 shows the internal configuration of the throttle device 1 when the throttle valve 2 with the first valve body 20 being orthogonal to the flow direction of the intake air A is in a fully-closed state.

In an exemplary form shown in FIG. 5, the first valve body 20 of the throttle valve 2 has a disc shape. The first valve body 20 is mounted on the first rotatable shaft 21 via a fastener 34 such as a bolt. The bypass valve 3 includes a large diameter portion 36 formed integrally with the second rotatable shaft 31. The large diameter portion 36 is configured to be larger in diameter than the second rotatable shaft 31. A part 37 of the large diameter portion 36 is cut out to have a semicircular shape (D-shape) as a cross-section orthogonal to the axis direction of the second rotatable shaft 31 is viewed. The part 37 of the large diameter portion 36 corresponds to the second valve body 30 of the rotary valve 33 described above.

As shown in FIG. 5, in the gear storage space 29, the first gear 5, the second gear 6, and a motor output gear 14 are stored. The first gear 5 and the second gear 6 mesh each other.

The motor output gear 14 is configured to transmit the driving force of the motor 4 to the first gear 5. In the exemplary form shown in FIG. 5, the motor output gear 14 includes a third gear 14A, a fourth gear 14B, a fifth gear 14C, and a sixth gear 14D. The third gear 14A is a gear fixed to an output shaft 41 of the motor 4 and rotates integrally with the output shaft 41 of the motor 4. The fourth gear 14B meshes with the third gear 14A. The fourth gear 14B and the fifth gear 14C are fixed to a common shaft 14E, and the fifth gear 14C rotates about the shaft 14E along with a rotation of the fourth gear 14B. The sixth gear 14D meshes with the fifth gear 14C. In addition, the sixth gear 14D also meshes with the first gear 5. The configuration of the motor output gear 14 is not limited to the example shown in FIG. 5, as long as the driving force of the motor 4 can be transmitted to the first gear 5.

Figure 6A:
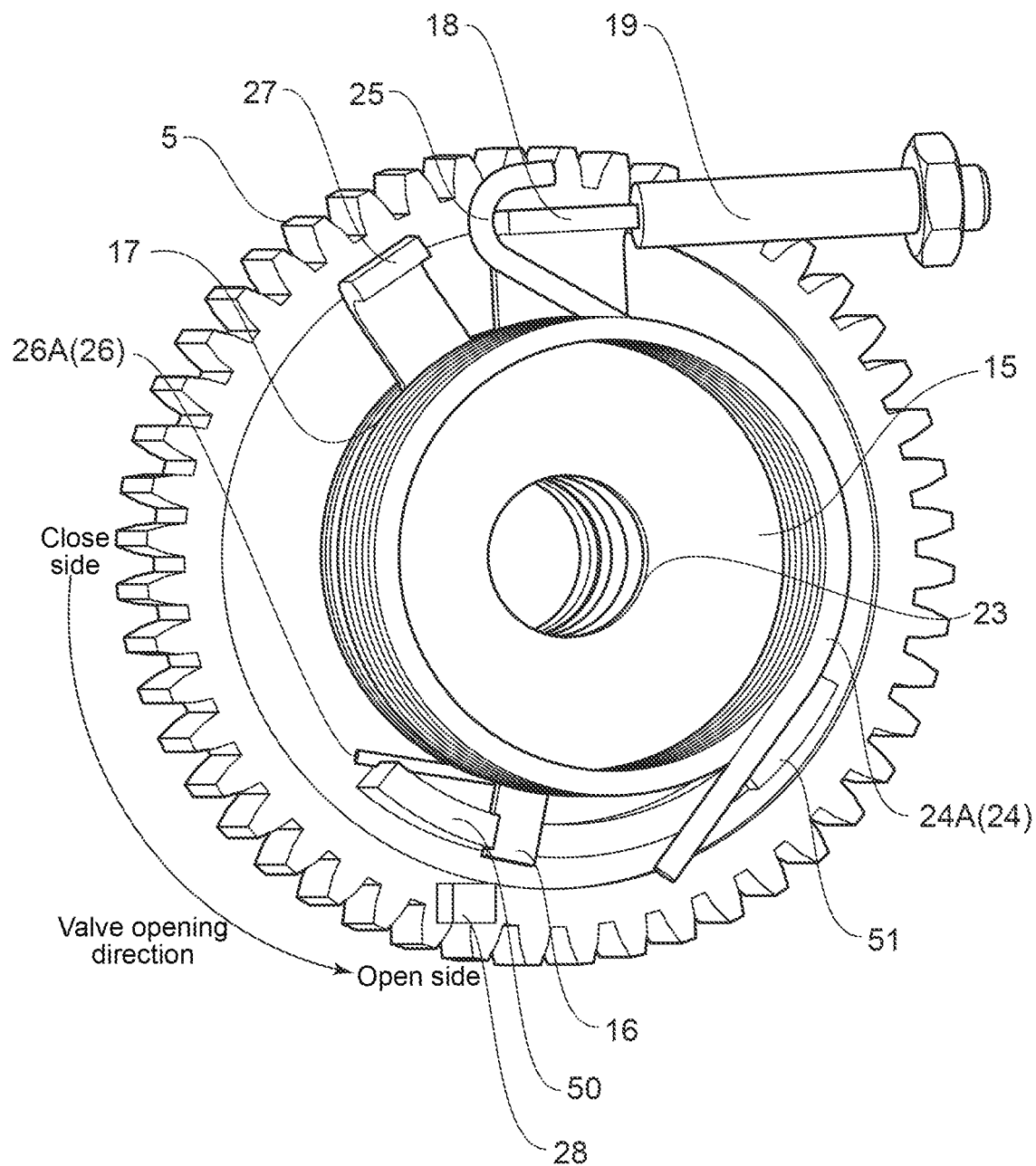
FIG. 6A is a perspective view showing a state in which the first gear is arranged at a first angular position according to an embodiment of the present disclosure.
Figure 6B:
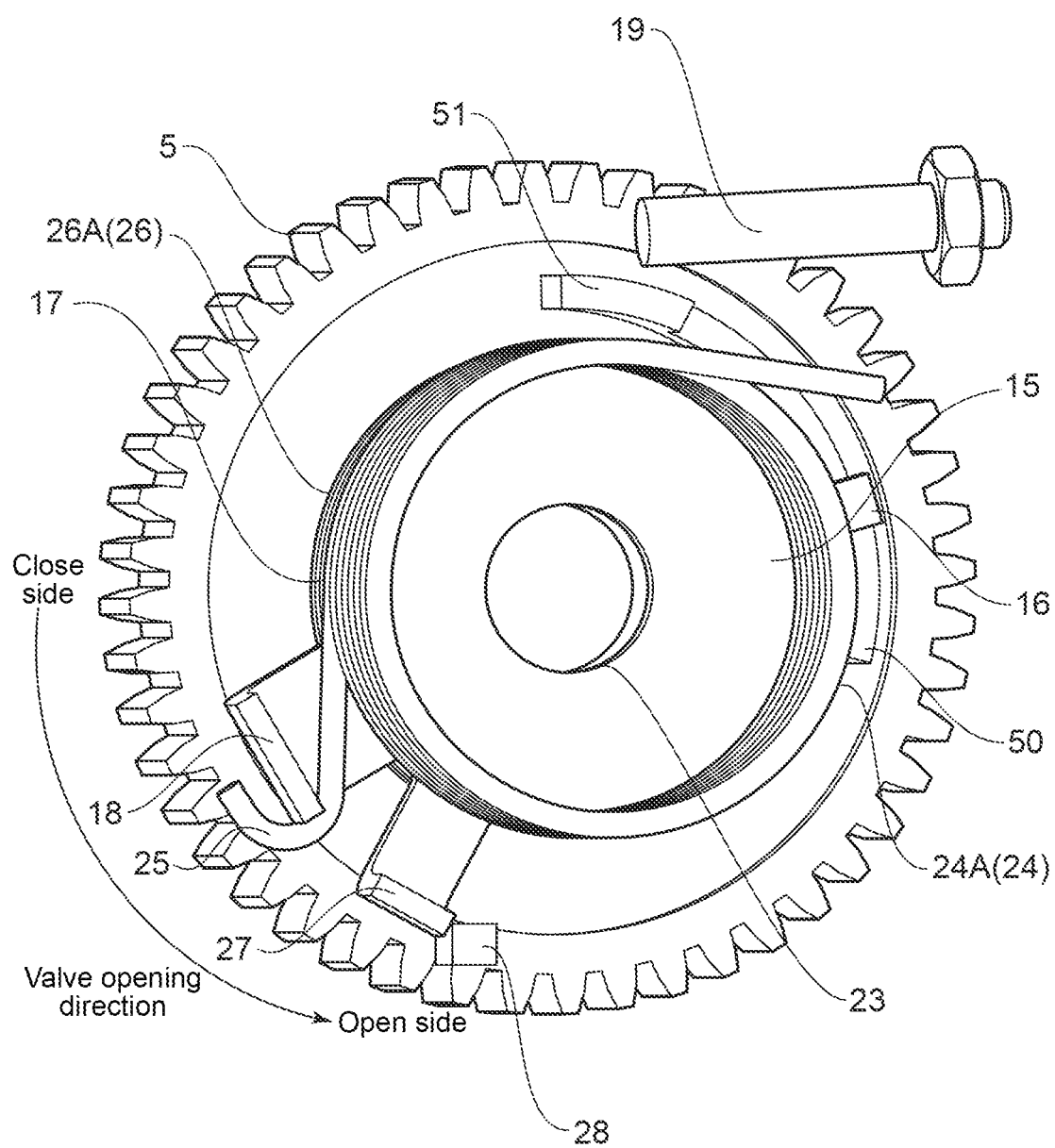
FIG. 6B is a perspective view showing a state in which the first gear is arranged at a second angular position according to an embodiment of the present disclosure.
Figure 6C:
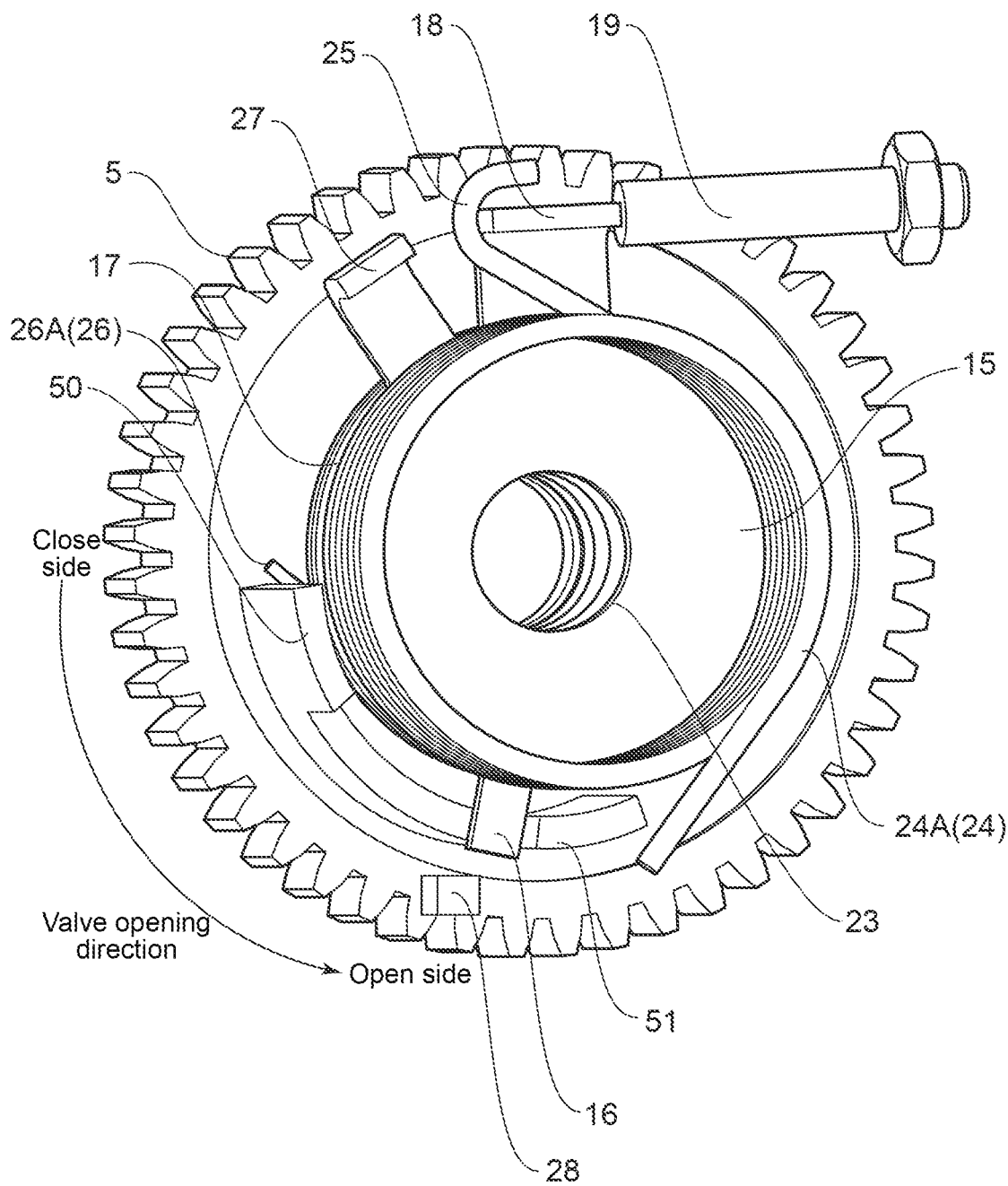
FIG. 6C is a perspective view showing a state in which the first gear is arranged at a third angular position according to an embodiment of the present disclosure.

Next, an example of a configuration capable of transmitting or blocking the driving force of the motor 4 with respect to the first rotatable shaft 21 will be described with reference to FIG. 5 and FIGS. 6A to 6C. Moreover, a radial direction of a circle drawn with the first rotatable shaft 21 as a center on a plane orthogonal to the first rotatable shaft 21 (a radial direction of the first rotatable shaft 21) will be referred to as the "radial direction". Moreover, FIG. 6A shows a state in which the first gear 5 is arranged at the first angular position P1. FIG. 6B shows a state in which the first gear 5 is arranged at the second angular position P2. FIG. 6C shows a state in which the first gear 5 is arranged at the third angular position P3.

In the exemplary form shown in each of FIG. 5 and FIGS. 6A to 6C, the throttle device 1 further includes a disc-shaped intermediate plate 15. The intermediate plate 15 is fixed to the first rotatable shaft 21 of the throttle valve 2. The intermediate plate 15 has, at an outer circumferential edge 17 thereof, an engagement protrusion 16 protruding radially outward. In the intermediate plate 15, an insertion hole 23 through which the first rotatable shaft 21 is inserted is formed. The intermediate plate 15 is fixed to the first rotatable shaft 21 with the first rotatable shaft 21 being inserted through the insertion hole 23.

Moreover, the first gear 5 is disposed on a close side in a valve opening direction of the throttle valve 2 relative to the engagement protrusion 16 of the intermediate plate 15, and includes a close-side engagement portion 50 engageable with the engagement protrusion 16. As shown in FIG. 5 and FIGS. 6A to 6C, the valve opening direction of the throttle valve 2 is a direction in which the first gear 5 rotates so as to increase the opening degree of the throttle valve 2. In an example shown in each of FIG. 5 and FIGS. 6A to 6C, the valve opening direction of the throttle valve 2 is a direction of a counterclockwise rotation (left rotation).

The close-side engagement portion 50 rotates integrally with the first gear 5. The engagement protrusion 16 of the intermediate plate 15 is disposed on a path where the close-side engagement portion 50 moves. In a fully-opened state of the bypass valve 3, the close-side engagement portion 50 engages with the engagement protrusion 16 of the intermediate plate 15. As shown in FIG. 6A, if the first gear 5 rotates counterclockwise with the first gear 5 being arranged at the first angular position P1, the intermediate plate 15 and the first rotatable shaft 21 also rotate counterclockwise (in the valve opening direction of the throttle valve 2) following the first gear 5. In a state in which the bypass valve 3 has not yet been fully opened (a fully-closed or half-opened state), the close-side engagement portion 50 of the first gear 5 is spaced apart from the engagement protrusion 16, and a rotational force of the first gear 5 is not transmitted to the intermediate plate 15 and the first rotatable shaft 21 (see FIG. 6C).

With the above-described configuration, in the fully-closed state of the throttle valve 2, the first gear 5 rotates toward the close side in the valve opening direction of the throttle valve 2, thereby causing the close-side engagement portion 50 to be spaced apart from the engagement protrusion 16 of the intermediate plate 15 and blocking the driving force of the motor 4 from the first gear 5 to the first rotatable shaft 21. Moreover, the second gear 6 receives the driving force of the motor 4 via the first gear 5. Then, the opening degree of the bypass valve 3 is adjusted in the state in which the close-side engagement portion 50 is spaced apart from the engagement protrusion 16 of the intermediate plate 15. Moreover, with the above-described configuration, in the opened state of the throttle valve 2, the first gear 5 rotates toward an open side in the valve opening direction of the throttle valve 2, thereby bringing the close-side engagement portion 50 into contact with the engagement protrusion 16 of the intermediate plate 15 and transmitting the driving force of the motor 4 from the first gear 5 to the first rotatable shaft 21.

As shown in FIGS. 6A to 6C, the first gear 5 may include an open-side engagement portion 51 engageable with the engagement protrusion 16. The open-side engagement portion 51 is disposed on the open side in the valve opening direction of the throttle valve 2 relative to the engagement protrusion 16 of the intermediate plate 15.

In some embodiments, as shown in FIG. 5 and FIGS. 6A to 6C, the intermediate plate 15 includes a first locking protrusion 18 for restricting movement of the intermediate plate 15 to the close side in the valve opening direction of the throttle valve 2. As shown in FIG. 6A, the throttle device 1 further includes a first stopper 19 configured to be engageable with the first locking protrusion 18, in order to prevent the intermediate plate 15 from rotating to the close side in the valve opening direction of the throttle valve 2 beyond a limit position corresponding to a fully-closed position of the throttle valve 2. The first stopper 19 is fixed to the left-hand casing 10A. Moreover, the first stopper 19 is disposed on the close side in the valve opening direction of the throttle valve 2 relative to the first locking protrusion 18.

With such configuration, even if the intermediate plate 15 rotates to the close side in the valve opening direction beyond the limit position corresponding to the fully-closed position of the throttle valve 2, the first stopper 19 engages with the first locking protrusion 18 of the intermediate plate 15 to deter the intermediate plate 15 from rotating to the close side in the valve opening direction of the throttle valve 2. Thus, it is possible to perform positioning of the first valve body 20 in the fully-closed state of the throttle valve 2. Moreover, in the idle operation of the engine 100, the intermediate plate 15 does not rotate to the close side in the valve opening direction of the throttle valve 2 compared with the state shown in FIG. 6A, making it possible to keep the throttle valve 2 in the fully-closed state.

In some embodiments, as shown in FIG. 5 and FIGS. 6A to 6C, the throttle device 1 further includes a first biasing member 24 for biasing the intermediate plate 15 to the close side in the valve opening direction of the throttle valve 2 to bring the first locking protrusion 18 closer to the first stopper 19. The first biasing member 24 is, for example, a first spring 24A (24) which includes a hook part 25 mounted on the first locking protrusion 18, and biases the first gear 5 to the close side in the valve opening direction of the throttle valve 2 via the first locking protrusion 18. The first spring 24A is disposed around the first rotatable shaft 21.

The function of the first biasing member 24 will be described in detail. For example, during the operation of the motor 4, if the angular position of the first gear 5 falls within a range between the first angular position (original position) P1 and the second angular position P2, the close-side engagement portion 50 of the first gear 5 is in contact with the engagement protrusion 16 of the intermediate plate 15. Subsequently, once the motor 4 is stopped, the first biasing member 24 biases the first locking protrusion 18 of the intermediate plate 15 toward the close side in the valve opening direction of the throttle valve 2, and the first gear 5 rotates to the first angular position P1 where the first locking protrusion 18 is locked by the first stopper 19 (see FIG. 6A).

With such configuration, if the driving force of the motor 4 transmitted to the first rotatable shaft 21 is smaller than a biasing force of the first biasing member 24 or the driving force of the motor 4 is not transmitted to the first rotatable shaft 21, it is possible to restore to a state before the driving force of the motor 4 acts on the throttle valve 2.

In some embodiments, as shown in FIG. 5 and FIGS. 6A to 6C, the throttle device 1 further includes a second biasing member 26 for biasing the first gear 5 to the open side in the valve opening direction of the throttle valve 2 to bring the close-side engagement portion 50 of the first gear 5 closer to the engagement protrusion 16 of the intermediate plate 15. As shown in FIG. 6A to 6C, the second biasing member 26 is in contact with the close-side engagement portion 50 and biases the first gear 5 to the open side in the valve opening direction of the throttle valve 2 via the close-side engagement portion 50. Such second biasing member 26 is, for example, a second spring 26A (26) and is disposed around the first rotatable shaft 21. Moreover, in an extending direction of the first rotatable shaft 21, the second spring 26A is disposed opposite to the first spring 24A across the intermediate plate 15.

The function of the second biasing member 26 will be described in detail. For example, during the operation of the motor 4, if the angular position of the first gear 5 falls within a range between the third angular position P3 and the first angular position (original position) P1, as shown in FIG. 6C, the first locking protrusion 18 of the intermediate plate 15 is locked by the first stopper 19, and the close-side engagement portion 50 of the first gear 5 is spaced apart from the engagement protrusion 16 of the intermediate plate 15. Subsequently, once the motor 4 is stopped, the second biasing member 26 biases the close-side engagement portion 50 of the first gear 5 toward the open side in the valve opening direction of the throttle valve 2, and the first gear 5 rotates to the open side in the valve opening direction of the throttle valve 2 until the close-side engagement portion 50 contacts the engagement protrusion 16 of the intermediate plate 15 (see FIG. 6A).

With such configuration, if the driving force of the motor 4 transmitted to the first rotatable shaft 21 is smaller than a biasing force of the second biasing member 26 or the driving force of the motor 4 is not transmitted to the first rotatable shaft 21, it is possible to restore to the state before the driving force of the motor 4 acts on the bypass valve 3.

In some embodiments, as shown in FIG. 5 and FIGS. 6A to 6C, the biasing force of the second biasing member 26 is configured to be smaller than the biasing force of the first biasing member 24. In the exemplary form shown in each of FIG. 5 and FIGS. 6A to 6C, the first spring 24A is larger in spring wire diameter than the second spring 26A. Moreover, the first spring 24A has substantially the same inner diameter as the second spring 26A. With such configuration, since the biasing force of the first biasing member 24 is larger than the biasing force of the second biasing member 26, a state in which the first locking protrusion 18 is pressed against the first stopper 19 by the first biasing member 24 is maintained, allowing the intermediate plate 15 to remain still, when the first gear 5 returns to the original position.

Moreover, in some embodiments, as shown in FIG. 5 and FIGS. 6A to 6C, the intermediate plate 15 includes a second locking protrusion 27 for restricting movement of the intermediate plate 15 to the open side in the valve opening direction of the throttle valve 2. The second locking protrusion 27 is positioned on the open side relative to the first locking protrusion 18 and on the close side relative to the engagement protrusion 16 in the valve opening direction of the throttle valve 2. Moreover, the first locking protrusion 18 and the second locking protrusion 27 are spaced apart from each other in the valve opening direction of the throttle valve 2.

Moreover, as shown in FIG. 5 and FIGS. 6A to 6C, the throttle device 1 further includes a second stopper 28 configured to be engageable with the second locking protrusion 27, in order to prevent the intermediate plate 15 from rotating to the open side in the valve opening direction beyond the limit position corresponding to the fully-opened position of the throttle valve 2. The second stopper 28 is fixed to the left-hand casing 10A. In other embodiments (not shown), the intermediate plate 15 may include the first locking protrusion 18 for restricting movement of the intermediate plate 15 to the open side in the valve opening direction of the throttle valve 2. In this case, the throttle device 1 further includes the second stopper 28 configured to be engageable with the first locking protrusion 18, in order to prevent the intermediate plate 15 from rotating to the open side in the valve opening direction of the throttle valve 2 beyond the limit position corresponding to the fully-opened position of the throttle valve 2. That is, with such configuration, the first locking protrusion 18 functions as the second locking protrusion 27, eliminating the need to provide the second locking protrusion 27.

The respective functions of the second locking protrusion 27 and the second stopper 28 will be described in detail. If the first gear 5 rotates toward the second angular position P2 beyond the first angular position P1, since the close-side engagement portion 50 of the first gear 5 is in contact with the engagement protrusion 16 of the intermediate plate 15, the driving force is transmitted to the intermediate plate 15, and the intermediate plate 15 rotates toward the open side in the valve opening direction of the throttle valve 2. As the intermediate plate 15 rotates, the opening degree of the throttle valve 2 increases. Then, once the throttle valve 2 is fully opened, the second locking protrusion 27 and the second stopper 28 engage with each other (see FIG. 6B).

With such configuration, even if the intermediate plate 15 rotates to the open side in the valve opening direction of the throttle valve 2 beyond the limit position corresponding to the fully-opened position of the throttle valve 2, the second stopper 28 engages with the second locking protrusion 27 of the intermediate plate 15 to deter the intermediate plate 15 from rotating to the open side in the valve opening direction of the throttle valve 2. Thus, it is possible to perform positioning of the first valve body 20 in the fully-opened state of the throttle valve 2.

Figure 7A:
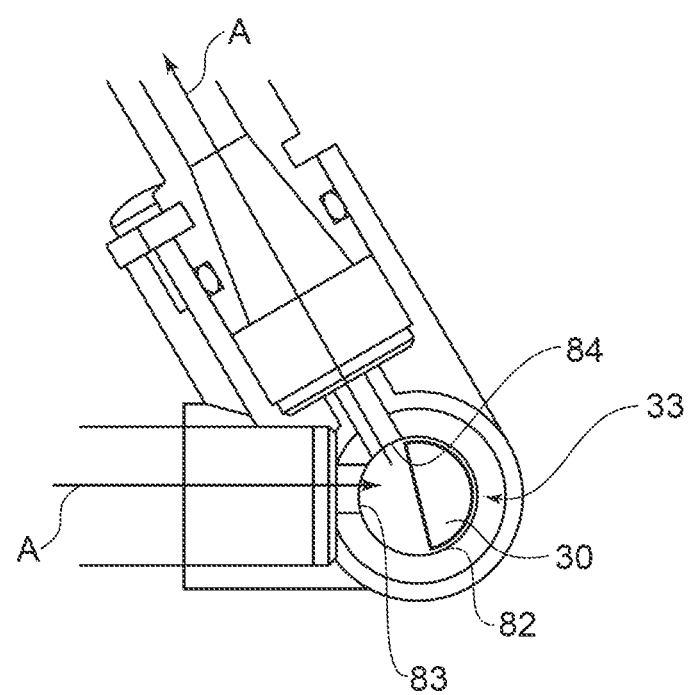
FIG. 7A is a view for describing an operation of a bypass valve according to an embodiment of the present disclosure and shows the state in which the first gear is arranged at the first angular position.
Figure 7B:
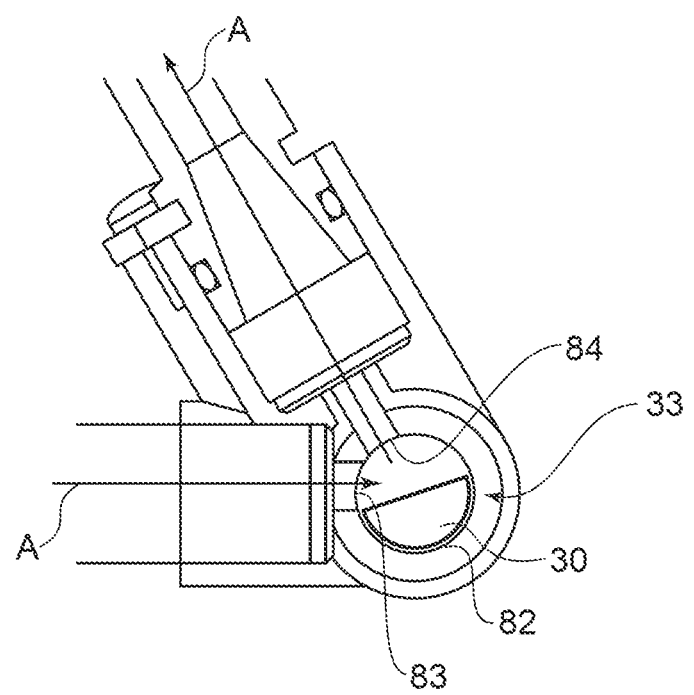
FIG. 7B is a view for describing the operation of the bypass valve according to an embodiment of the present disclosure and shows the state in which the first gear is arranged at the second angular position.
Figure 7C:
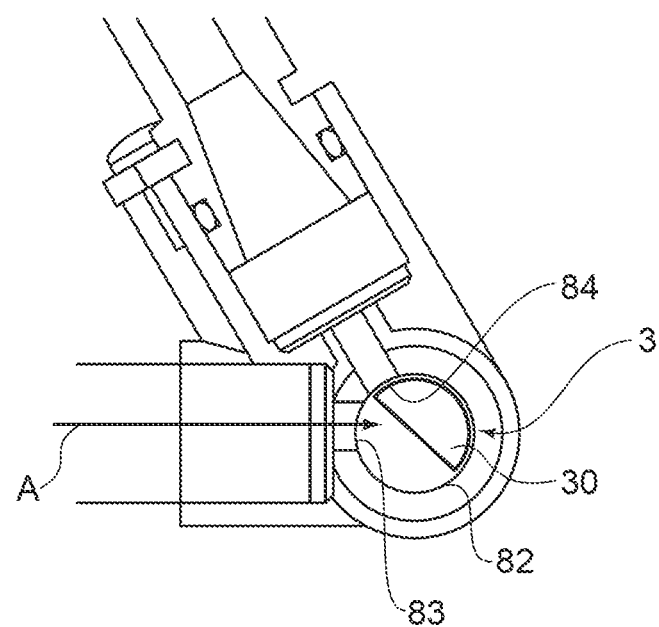
FIG. 7C is a view for describing the operation of the bypass valve according to an embodiment of the present disclosure and shows the state in which the first gear is arranged at the third angular position.

Next, the bypass valve 3 when the first gear 5 is arranged at the first angular position P1, the second angular position P2, and the third angular position P3 will be described with reference to FIGS. 7A to 7C, respectively. FIG. 7A shows the bypass valve 3 when the first gear 5 is arranged at the first angular position P1. FIG. 7B shows the bypass valve 3 when the first gear 5 is arranged at the second angular position P2. FIG. 7C shows the bypass valve 3 when the first gear 5 is arranged at the third angular position P3.

As shown in FIG. 7A, the inlet 83 and the outlet 84 of the crossing part 82 are entirely opened, when the first gear 5 is arranged at the first angular position P1. As shown in FIG. 7B, although the bypass valve 3 rotates as compared with when the first gear 5 is arranged at the first angular position P1, the inlet 83 and the outlet 84 of the crossing part 82 are entirely opened, when the first gear 5 is arranged at the second angular position P2. As shown in FIG. 7C, the inlet 83 of the crossing part 82 is entirely opened, whereas the outlet 84 of the crossing part 82 is entirely obstructed by the bypass valve 3, when the first gear 5 is arranged at the third angular position P3. Thus, in the present disclosure, the opening degree of the bypass valve 3 is adjusted by changing an opening area of the outlet 84 of the crossing part 82.

With such configuration, it is possible to accurately adjust the opening degree of the bypass valve 3 in the fully-closed state of the throttle valve 2 (in the idle operation of the engine 100) and to adjust the opening degree of the throttle valve 2 while maintaining the fully-opened state of the bypass valve 3.

An operation/effect of the throttle device 1 according to an embodiment of the present disclosure will be described. According to the present embodiment, including the common motor 4 for applying the driving force to the throttle valve 2 and the bypass valve 3, it is possible to suppress an increase in cost and weight as compared with a case in which the motors 4, 4 are provided for the throttle valve 2 and the bypass valve 3, respectively.

Moreover, according to the present embodiment, since the sensor 7 detects the rotation amount of the second rotatable shaft 31 for rotatably holding the second valve body 30, the actual opening degree of the bypass valve 3 is detected. Then, adjusting the opening degree of the bypass valve 3 based on the above detection result, it is possible to accurately adjust the opening degree of the bypass valve 3 as compared with a case in which the opening degree of the bypass valve 3 is not adjusted based on the actual opening degree of the bypass valve 3.

Moreover, according to the present embodiment, although the bypass valve 3 has already been fully opened when the first gear 5 rotates to the open side in the valve opening direction of the throttle valve 2 beyond the first angular position P1 (original position), the second rotatable shaft 31 of the bypass valve 3 keeps rotating by the driving force received from the motor 4 via the first gear 5 and the second gear 6. Thus, since the rotation amount of the second rotatable shaft 31 of the bypass valve 3 is detected by the sensor 7, it is also possible to detect the rotation amount of the first rotatable shaft 21 of the throttle valve 2. That is, it is possible to cause the sensor 7 to function as a throttle position sensor for detecting the actual opening degree of the throttle valve 2. Thus, it is possible to suppress the increase in cost and weight of the throttle device 1 while maintaining the configuration in which the opening degree of each of the throttle valve 2 and the bypass valve 3 is accurately adjusted.

In the embodiments described above with reference to FIGS. 3 to 5, since the bypass valve 3 is disposed opposite to the motor 4 across the throttle valve 2, the second gear 6 receives the driving force of the motor 4 via the first gear 5 and transmits power to the second rotatable shaft 31 of the bypass valve 3. Such device arrangement is suitable for, for example, an in-line engine or a parallel engine where two cylinders 102 are disposed in the first direction D1.

By contrast, in the case of a V-engine where the two cylinders 102 are disposed into a V-shape, a space is easily ensured between the intake passages 101 connected to the cylinders 102, respectively, and thus the bypass valve 3 may be disposed opposite to the throttle valve 2 across the motor 4.

Figure 9:
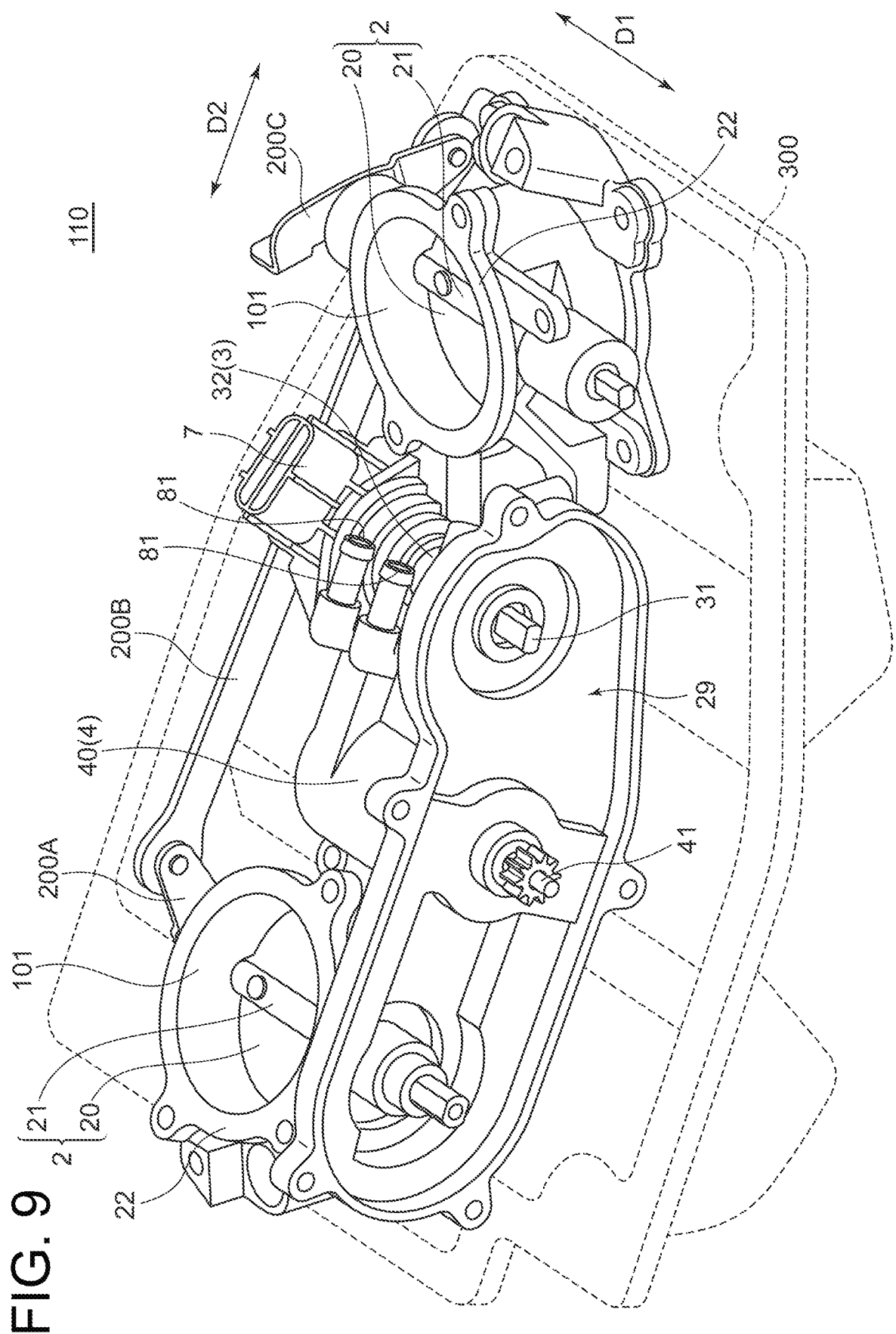
FIG. 9 is a perspective view showing the configuration of a throttle device according to another embodiment of the present disclosure.
Figure 10:
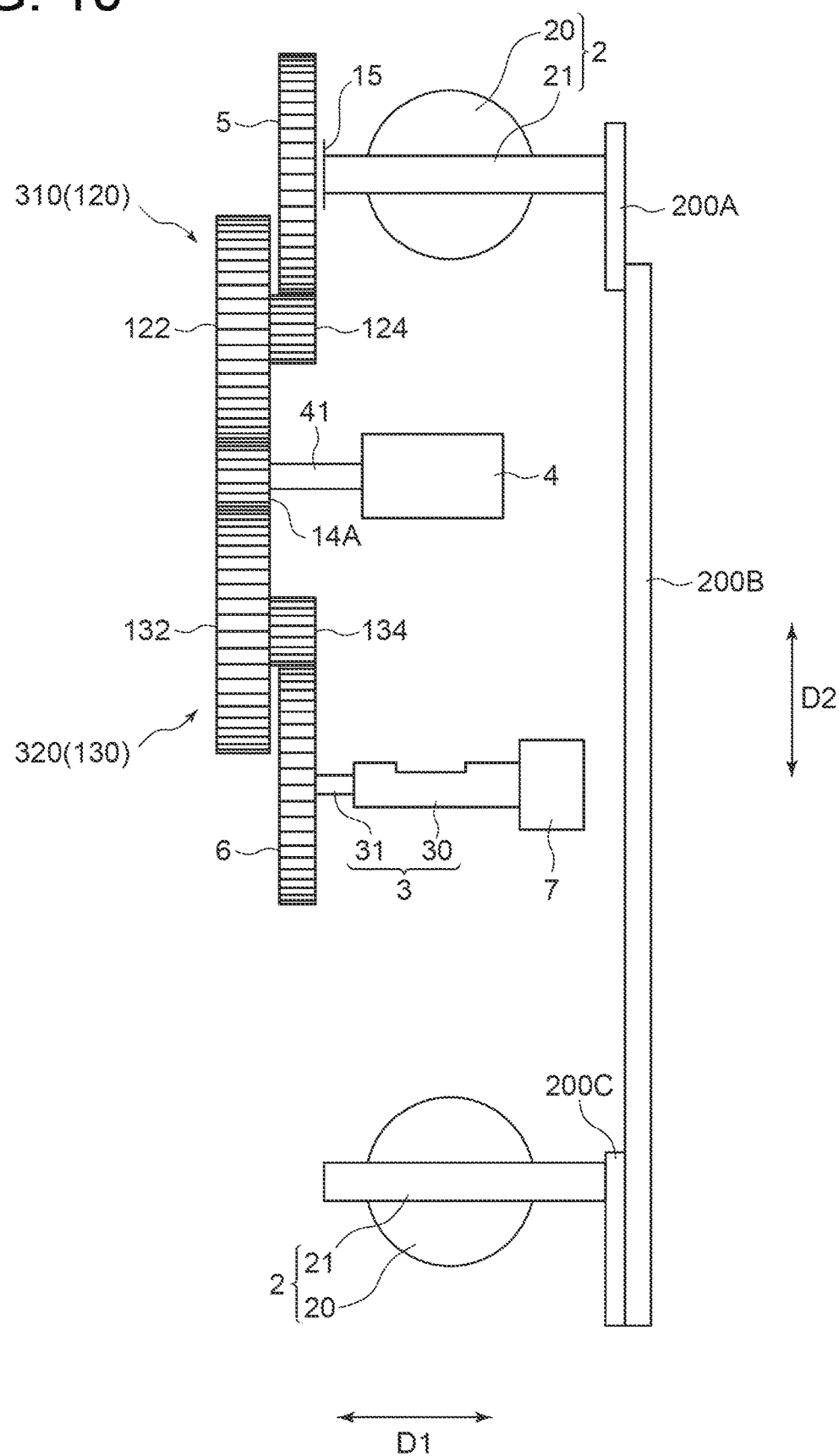
FIG. 10 is a view for describing a power transmission path of the throttle device according to another embodiment of the present disclosure.

FIG. 9 is a perspective view showing the configuration of a throttle device according to an embodiment of the present disclosure. FIG. 10 is a view for describing a power transmission path of the throttle device according to another embodiment of the present disclosure.

Hereinafter, the constituent elements described with reference to FIGS. 3 to 5 are denoted by the same reference characters, and repetitive description thereof will be omitted.

In some embodiments, as shown in FIGS. 9 and 10, a throttle device 110 includes a pair of throttle valves 2 each including the first valve body 20 and the first rotatable shaft 21, the bypass valve 3 including the second valve body 30 and the second rotatable shaft 31, and the common motor 4 for applying the driving force to the throttle valve 2 and the bypass valve 3.

The pair of throttle valves 2 are disposed on both sides across the motor 4 and the bypass valve 3 in the second direction D2 orthogonal to the first direction D1 (that is, the axis direction of the first rotatable shaft 21). The respective first rotatable shafts 21 of the pair of throttle valves 2 are coupled via a plurality of links 200 (200A, 200B, 200C), causing the pair of throttle valves 2 to operate together.

The link 200A is rotatably coupled at one end to the first rotatable shaft 21 of one of the throttle valves 2. The link 200A is coupled at the other end to one end of the link 200B extending so as to pass through the motor 4 and the bypass valve 3 from a coupling position to the link 200A in the second direction D2. The link 200B is coupled at the other end to the link 200C. The link 200C is rotatably coupled, at an end opposite to a coupling portion to the link 200B, to the first rotatable shaft 21 of the other of the throttle valves 2.

The pair of throttle valves 2 are, respectively, housed in the throttle bodies 22 disposed separately. In the throttle bodies 22, bores (intake passages 101) for arranging the throttle valves 2 are formed, respectively. In the throttle bodies 22 corresponding to the pair of throttle valves 2, respectively, the center axes of the bores are not parallel to but cross each other, and the intake passages 101 extend toward the respective cylinders of the V-engine.

The embodiment shown in FIG. 10 includes a first power transmission path 310 for transmitting power from the output shaft 41 of the motor 4 to the first rotatable shaft 21 of one of the throttle valves 2, and a second power transmission path 320 for transmitting power from the output shaft 41 of the motor 4 to the second gear 6 of the bypass valve 3. The first power transmission path 310 and the second power transmission path 320 are housed in the gear storage space 29 shown in FIG. 9.

Moreover, the power transmitted to one of the throttle valves 2 via the first power transmission path 310 is transmitted to the first rotatable shaft 21 of the other throttle valve 2 via the links 200 (200A, 200V, 200C). Thus, the pair of throttle valves 2 and the bypass valve 3 are driven by the common motor 4.

The first power transmission path 310 is disposed on the side of the throttle valve 2 relative to the motor 4 in the second direction D2.

In the exemplary embodiment shown in FIG. 10, the first power transmission path 310 includes a large diameter gear portion 122 meshing with the output shaft 41 of the motor 4, and a first relay gear 120 which has a small diameter gear portion 124 meshing with the first gear 5.

The first gear 5 applied with the driving force of the motor 4 via the first power transmission path 310 is configured to be able to transmit or block the driving force of the motor 4 with respect to the first rotatable shaft 21, as described above regarding the throttle device 1. For example, with the object of switching transmission or blocking of power by the first gear 5, the intermediate plate 15 described above with reference to FIGS. 6A to 6C may be provided.

Upon receiving power transmission from the first gear 5, one of the throttle valves 2 performs an opening/closing operation. In conjunction with this, the other throttle valve 2 also performs the opening/closing operation via the links 200 (200A, 200B, 200C).

The second power transmission path 320 is a power transmission path without the first gear 5, and is disposed on the side of the bypass valve 3 relative to the motor 4 in the second direction D2.

In the exemplary embodiment shown in FIG. 10, the second power transmission path 320 includes a large diameter gear portion 132 meshing with the output shaft 41 of the motor 4, and a second relay gear 130 which has a small diameter gear portion 134 meshing with the second gear 6.

Upon receiving power transmission from the second gear 6, the bypass valves 3 performs the opening/closing operation. At this time, the rotation amount of the second rotatable shaft 31 of the bypass valve 3 is detected by the sensor 7.

In the throttle device for the V-engine, in general, a distance between the pair of throttle valves 2 in the second direction D2 tends to be large. Thus, for example, in adopting a layout where the throttle device is accommodated in a cleaner box 300, a reduction in dimension of the throttle device in the second direction D2 is required.

In this regard, in the above configuration of the throttle device 110, regarding the second direction D2, since one of the throttle valves 2 and the bypass valve 3 are disposed on the both sides across the motor 4, and power is transmitted to the bypass valve 3 via the second power transmission path 320 without the first gear 5, it is possible to implement downsizing of the throttle device 110. Thus, it is also possible to accommodate the throttle device 110 in the cleaner box 300.

The throttle device 1 according to an embodiment of the present disclosure has been described above. However, the present invention is not limited to the above-described form, and various modifications can be made as long as they do not depart from the object of the present invention.

The invention claimed is:

1. A throttle device, comprising:
a throttle valve which is disposed in an intake passage, and includes a first valve body and a first rotatable shaft for rotatably holding the first valve body;
a bypass valve which is disposed in a bypass passage connected to the intake passage so as to bypass the throttle valve, and includes a second valve body and a second rotatable shaft for rotatably holding the second valve body;
a common motor for applying a driving force to the throttle valve and the bypass valve;
a first gear configured to be able to transmit or block the driving force of the motor with respect to the first rotatable shaft;
a second gear configured to receive the driving force of the motor and transmit the driving force to the second rotatable shaft;
a sensor for detecting a rotation amount of the second rotatable shaft of the bypass valve or another rotatable shaft rotating in conjunction with the second rotatable shaft; and
an intermediate plate fixed to the first rotatable shaft of the throttle valve, the intermediate plate including an engagement protrusion at an outer circumferential edge of the intermediate plate,
wherein the first gear includes a close-side engagement portion engageable with the engagement protrusion of the intermediate plate,
wherein the second gear is configured to transmit the driving force of the motor to the bypass valve and drive the bypass valve to open and close,
wherein, unless the bypass valve is in a fully-opened state, the first gear is configured to rotate while the close-side engagement portion of the first gear is spaced apart from the engagement protrusion of the intermediate plate such that a rotational force of the first gear is not transmitted to the intermediate plate and the first rotatable shaft, and the throttle valve is maintained in a fully-closed state, and
wherein, when the bypass valve is in the fully-opened state, the first gear is configured to rotate while the close-side engagement portion of the first gear contacts with the engagement protrusion of the intermediate plate such that the rotational force of the first gear is transmitted to the intermediate plate and the first rotatable shaft to open the throttle valve.

2. The throttle device according to claim 1,
wherein the bypass valve is configured such that an opening thereof is adjusted by the driving force received by the second gear via the first gear, in a state in which the close-side engagement portion of the first gear is spaced apart from the engagement protrusion of the intermediate plate.

3. The throttle device according to claim 1,
wherein the intermediate plate includes a first locking protrusion for restricting movement of the intermediate plate to the close side in the valve opening direction, and
wherein the throttle device further comprises a first stopper configured to be engageable with the first locking protrusion, in order to prevent the intermediate plate from rotating to the close side in the valve opening direction beyond a limit position corresponding to the fully-closed position of the throttle valve.

4. The throttle device according to claim 3, further comprising a first biasing member for biasing the intermediate plate to the close side in the valve opening direction to bring the first locking protrusion closer to the first stopper.

5. The throttle device according to claim 4, further comprising a second biasing member for biasing the first gear to an open side in the valve opening direction to bring the close-side engagement portion of the first gear closer to the engagement protrusion of the intermediate plate,
wherein the second biasing member has a biasing force smaller than that of the first biasing member.

6. The throttle device according to claim 1, further comprising a second biasing member for biasing the first gear to an open side in the valve opening direction to bring the close-side engagement portion of the first gear closer to the engagement protrusion of the intermediate plate.

7. The throttle device according to claim 1,
wherein the intermediate plate includes a second locking protrusion for restricting movement of the intermediate plate to an open side in the valve opening direction, and
wherein the throttle device further comprises a second stopper configured to be engageable with the second locking protrusion, in order to prevent the intermediate plate from rotating to the open side in the valve opening direction beyond a limit position corresponding to a fully-opened position of the throttle valve.

8. The throttle device according to claim 1, further comprising a controller configured to control the motor based on a detection result of the sensor.

9. The throttle device according to claim 1,
wherein the sensor is mounted on the second rotatable shaft of the bypass valve to detect a rotation amount of the second rotatable shaft of the bypass valve.

10. The throttle device according to claim 1,
wherein the bypass valve is disposed opposite to the motor across the throttle valve, and
wherein the second gear is configured to receive the driving force of the motor via the first gear.

11. The throttle device according to claim 1,
wherein the bypass valve is disposed opposite to the throttle valve across the motor, and
wherein the second gear is configured to receive the driving force of the motor via a power transmission path without the first gear.

12. The throttle device according to claim 1,
wherein the first gear is configured to rotate between a first angular position and a second angular position such that an opening degree of the throttle valve is changed while the bypass valve is kept fully opened, where the first angular position is an angular position of the first gear when the throttle valve is fully closed and the bypass valve is fully opened, and the second angular position is an angular position of the first gear when the throttle valve and the bypass valve are both fully opened.

13. The throttle device according to claim 1,
wherein the bypass valve includes a rotary valve disposed in the bypass passage rotatably about the second rotatable shaft.

14. The throttle device according to claim 13,
wherein the bypass passage includes:
- an inlet passage; and
- an outlet passage extending in a direction crossing the inlet passage at an acute angle in a planar view as viewed from an axis direction of the second rotatable shaft, and wherein the rotary valve is disposed in a crossing part of the inlet passage and the outlet passage.

* * * * *